June 2, 1959 H. C. KING ET AL 2,889,477

CLAMP AND MOUNTING ARRANGEMENT

Filed June 16, 1955

INVENTORS.
Harry C. King
Wilfred H. Hough
By: Mason, Kolehmainen, Rathburn & Wyss
Attys.

United States Patent Office 2,889,477

Patented June 2, 1959

2,889,477

CLAMP AND MOUNTING ARRANGEMENT

Harry C. King, Lancaster, and Wilfred H. Hough, Buffalo, N.Y., assignors to Sylvania Electric Products Inc., a corporation of Massachusetts Application June 16, 1955, Serial No. 515,892

5 Claims. (Cl. 313—76)

The present invention relates to clamps, and, more particularly, to an improved clamp and mounting arrangement for supporting the deflection windings and focusing unit of a television receiver in fixed position on the television picture tube.

It has been common practice in conventional television receivers to support the cathode ray picture tube on the receiver chassis from at least two points, one on the bell portion of the tube near the face thereof and the other at the neck thereof. With such arrangements the neck of the picture tube is supported by means of a sweep yoke assembly which itself is attached directly to a portion of the receiver chassis. Forward movement of the picture tube with respect to the chassis is prevented by means of a stop arrangement attached to the chassis and located forward of the picture tube face, and rearward movement of the picture tube with respect to the chassis is prevented by the forward end of the yoke assembly engaging the bulb surface of the tube.

It has recently been found to be expedient, however, to support a television picture tube in a television receiver entirely from the forward or flared body portion thereof and to mount the focusing and deflection units directly on the picture tube. Since it is desirable that the focusing and deflection units be adjusted at the factory, it is necessary to maintain them in a fixed position relative to the picture tube while they are in transit and subjected to high vibration, jarring and some times severe shocks. Therefore, it would be desirable to provide a simple means for fixedly positioning these units on the picture tube both during and after shipment so that realignment of the focusing and deflection units is not required after the receiver reaches its destination. It would also be desirable to provide such positioning means which need not be removed when the receiver arrives at its destination so that the receivers may merely be removed from their shipping cartons and are ready for use.

In the case of television receivers employing electrostatic focusing the problem of fixedly positioning the sweep yoke and associated picture centering device has been solved by the use of a resilient clamp which is disclosed in a co-pending application, Serial No. 477,481 in the name of Henry D. Mech, filed on December 24, 1954, which is assigned to the same assignee as the present invention. Where magnetic focusing is employed, this simple clamp is not altogether satisfactory because of the relatively large mass of the magnetic focalizer unit which surrounds the neck of the picture tube and which is mounted for universal movement with respect thereto.

Since it is necessary that the focalizer unit as well as the sweep yoke assembly be fixedly located with respect to the picture tube and since it is desirable that these components be supported solely by the picture tube, an object of the present invention is to provide a new and improved mounting arrangement for physically supporting a sweep yoke assembly and a focalizer unit on the neck of a television picture tube.

Another object of the present invention is to provide a clamp which may be attached at any desired position along a longitudinal member such, for example, as along the neck of a cathode ray tube.

Still another object of the present invention is to provide an improved device for attaching relatively heavy and movable members to a longitudinal support such, for example, as the neck of a cathode ray tube.

A further object of the invention is to provide a mounting arrangement for supporting a magnetic focusing unit from the picture tube and more particularly from the neck of a television picture tube which arrangement supports the focusing unit in a rigid manner so that the unit does not have to be realigned after shipment of the receiver to the customer.

Still another object of the present invention is to provide an improved arrangement for mounting a deflection and focusing assembly on the neck of a picture tube independently of the chassis in an inexpensive and yet reliable manner.

A still further object of the invention is to provide a device which is adapted to be attached to the neck of the cathode ray picture tube and which may be used to support relatively heavy members at fixed positions along the neck of the picture tube.

A further object of the invention is to provide an inexpensive clamp for accurately positioning and supporting a magnetic deflection winding on a television picture tube and also for supporting a focusing unit at a fixed location on the neck of a television picture tube.

Briefly, the above objects are realized in accordance with the present invention by the provision of a mounting arrangement wherein a novel clamp is secured to the neck of the picture tube intermediate the sweep yoke assembly and the focalizer unit. One portion of the clamp is adapted to engage the rearward end of the sweep yoke to maintain the forward end of the yoke firmly against the bulb of the picture tube, and another portion of the clamp is adapted to support the focalizer unit therefrom. The clamp is so shaped and the focalizer is so mounted thereon that attempted movement of the focalizer along the neck of the tube results in an increased gripping action between the clamp and the tube, thereby to increase the resistance to the attempted movement of the focalizer.

The invention, both as to its organization and method of operation, together with further objects and advantages thereof, will best be understood by references to the following detailed description, taken in connection with the accompanying drawings, in which.

Figures 1, 2, 4:
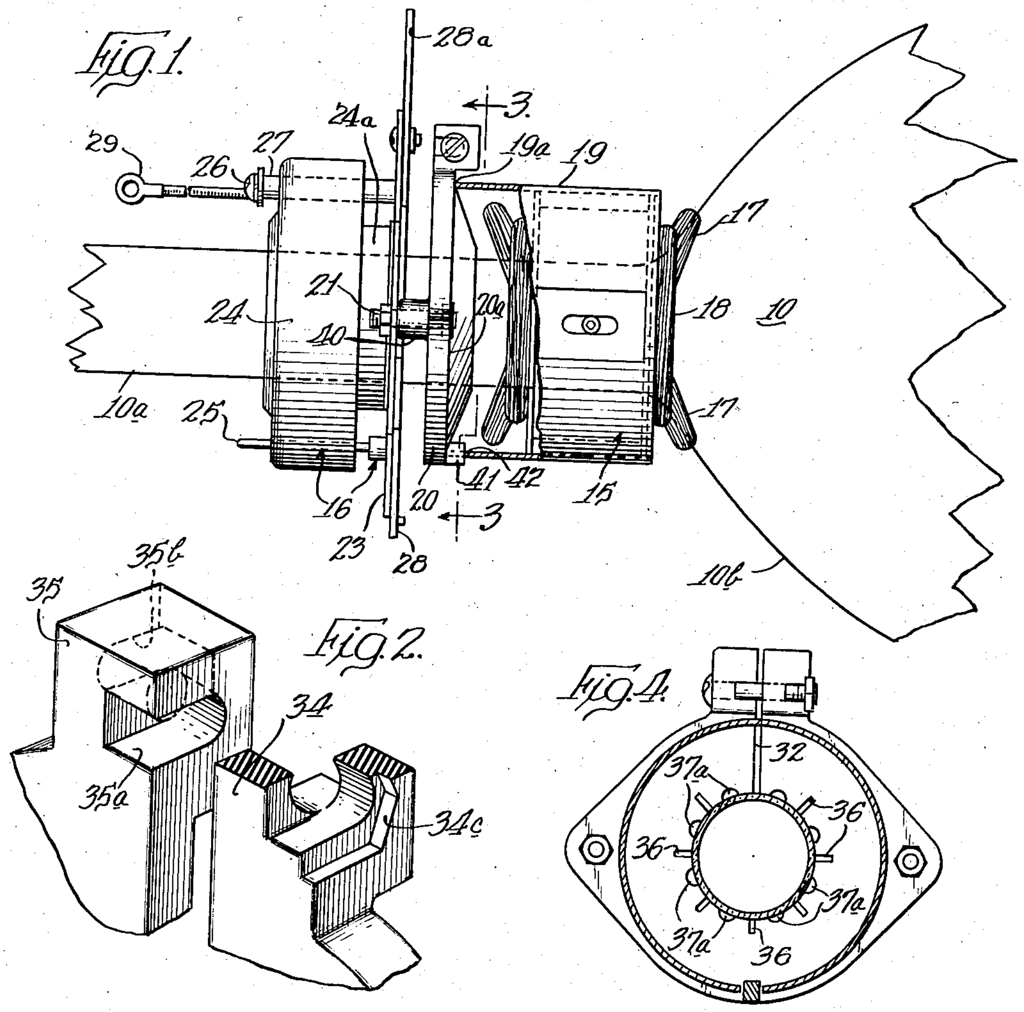
Fig. 1 is a fragmentary, partially sectioned elevation view of a sweep yoke assembly and focalizer unit supported on a television picture tube in accordance with the present invention.
Fig. 2 is a partial sectional perspective view of the clamping member employed in the arrangement of Fig. 1.
Fig. 4 is a plan view of an alternative embodiment of the clamp of the present invention.

Referring now to the drawings, and more particularly to Fig. 1 thereof, there is shown a conventional television picture tube 10 having a neck portion **10*a* and a flared or bell portion 10*b*. In order to cause the electron beam of the tube 10 to scan the face (not shown) thereof in both a vertical and a horizontal direction to produce a raster thereon, a sweep yoke assembly 15 is mounted on the neck 10*a*, and in order to focus the electrons in the beam at a point on the face of the tube 10 a magnetic focalizer unit 16 is also mounted on the neck 10***a*.

The sweep yoke assembly 15 is substantially conventional in that it includes a pair of vertical deflection windings 17 and a pair of horizontal deflection windings 18 arranged about the neck 12 of the picture tube 10 so that the magnetic fields therefrom intercept the electron beam in the neck of the tube 10 to effect the required scanning action. The windings 17 and 18 are suitably supported within a tubular housing 19 which extends rearwardly of the windings 17 and 18 terminating in the rear at the planer end 19*a*.

In accordance with the present invention the sweep yoke assembly 15 is maintained in fixed position along the electron path of the cathode ray beam so as to insure uniformity of picture size by means of a clamp 20 which is secured to the neck 10*a* at a fixed position thereon with the forward side 20*a* thereof abutting against the rearward end 19*a* of the sweep yoke assembly housing 19. By securing the clamp 20 at such a location along the neck of the tube that the vertical deflection windings 17 are firmly held thereby against the belled portion 10*b*, both forward and rearward movement of the sweep yoke assembly 15 with respect to the tube 10 is prevented.

The focalizer unit 16 is located at a fixed position along the neck 10*a* of the tube 10 by the attachment thereof to the clamp 20 by suitable bolts 21 and 22. It may thus be seen that movement of the sweep yoke 15 or the focalizer 16 along the neck 10*a* may only be accomplished by movement of the clamp 20 with respect to the tube 10.

Although the particular structure of the focalizer unit 16 does not constitute a part of the present invention, to facilitate an understanding of the invention it is pointed out that the focalizer 16 includes a generally annular support member 23 to which is attached for axial movement a field shunt member 24, the relative position thereof with respect to the magnet 24*a* being determinative of whether or not the electron beam is focused on the face of the picture tube. Since in present day receivers adjustment of the focalizer unit must be made not only when the receiver is first assembled but at periodic intervals thereafter, means including the rearwardly extending rod 25, the screw and sleeve 26 and 27 and the adjusting rod 29 are provided for manually adjusting the position of the shunt 24 with respect to the support member 23 and magnet 24*a* along the longitudinal axis of the picture tube. A conventional centering shunt 28 includes a handle portion 28*a* which may be used manually to rotate the shunt 28 to center the raster properly on the face of the picture tube.

Figure 3:
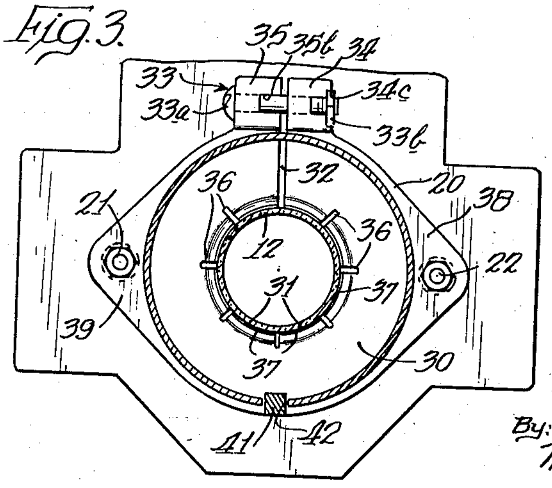
Fig. 3 is a partial sectional view taken along the line 3—3 of Fig. 1.

The clamp 20 which constitutes an important part of the present invention and which is best shown in Fig. 3, comprises a relatively rigid yet somewhat bendable unit 30 which is adapted to surround the neck 10*a* of the picture tube 10 and is provided with a circularly shaped central aperture 31 which has a diameter slightly larger than the outer diameter of the neck 10*a* of the picture tube 10. The unit 30 is slit at 32 so that the coaction of a bolt 33 and the offstanding ears 34 and 35 may conveniently be used to contract the structure 30 such that the inner portion thereof firmly engages the neck of the picture tube. In order to prevent relative rotation between the clamp 20 and the neck 10*a* and to substantially uniformly distribute the load around the tube neck there is provided a plurality of slits 36 which extend radially outward from the aperture 31. By thus providing the slits 36 there is effected a plurality of frictional areas 37 which extend inwardly from the surrounding structure 30 and which engage the neck of the picture tube at a plurality of points so that relative rotation between the clamp 20 and the neck 12 is prevented. In a reduction to practice, it has been found that eight areas 37 are sufficient to prevent relative rotation between the sweep yoke assembly 15 and the focalizer unit 16 with respect to the television picture tube 10 under normal conditions.

Referring to Fig. 4, there is shown a modified clamp 20, which is particularly suitable for applications where the receiver is subjected to excessive jarring and vibration. This modified construction provides an increased number of protuberances, sixteen in the particular embodiment shown, without appreciably reducing the overall strength of the clamp 20. Specifically, it includes a plurality of outwardly directed recesses 37*a* respectively arranged intermediate the slits 36, thereby to double the number of pressure contact areas which engage the neck 10*a*.

The clamp 20 is provided with offstanding ears 38 and 39 which are arranged on diametrically opposed sides of the aperture 31 along a line substantially perpendicular to the slot 32 and which are each provided with apertures through which the mounting bolts 21 and 22 are respectively positioned. In order to insure that the focalizer unit 16 is secured to the clamp 20 at only two places, namely, the locations of the bolts 21 and 22, rearwardly extending bosses 40 are provided in registry with the apertures in the ears 38 and 39 and the focalizer unit 16 is firmly held in engagement with the bosses 40 by the bolts 21 and 22. When, therefore, a television receiver including a picture tube 10 and the mounting arrangement of the present invention is subjected to a severe shock such, for example, as when it is dropped on its front or back end, the relatively heavy focalizer unit 16 exerts a force on each of the ears 38 and 39 on opposite sides of an axial line concentric with the slot 32 which tends to bend the clamp 20 along a line including the slot 32 thereby to pinch the frictional areas 37 more tightly against the neck 10*b* of the picture tube 10. Additional gripping of the tube 10 by the clamp 20 is thus effected and movement of the sweep yoke assembly 15 and focalizer unit 16 along the neck 10*b* of the tube 10 is prevented.

Since it is important that the sweep yoke assembly 15 be prevented from rotating with respect to the face of the cathode ray tube, because such relative movement would result in a rotation of the picture on the face of the tube, a forwardly extending lug 41 is provided on the clamp 20 and is adapted to be received in a recess 42 provided in the rear end 19*a* of the housing 19 in which the deflection windings 17 and 18 are mounted. While a single lug 41 is shown, it will be understood that one or more additional lugs may be provided if desired.

Figure 5:
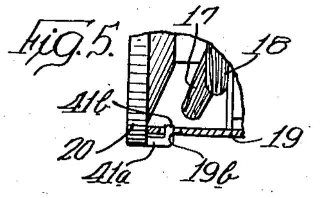
Fig. 5 is a partial sectional view of an alternative arrangement for securing a mounting clamp to a sweep yoke assembly.

Referring to Fig. 5 there is illustrated an alternative arrangement whereby the clamp 20 is attached to the housing 19 of the sweep yoke assembly 15. In this arrangement, the housing 19 is provided with an aperture 19*b* near the rear end 19*a* thereof and the clamp 20 is provided with a forwardly extending finger 41*a* having an inwardly directed end 41*b* which is adapted to be received in the aperture 19*b*.

Since the clamp 20 is positioned on the neck of the picture tube 10 in close proximity to the focalizer unit 16 and the sweep yoke assembly 15 as well as to the electron stream, it must be constructed of a non-magnetic material to prevent interference with the magnetic fields controlling the various parameters of the beam and thus prevent defocusing and distortion of the reproduced picture. Furthermore, the clamp 20 should be relatively light to minimize the strain effected thereby on the picture tube envelope. Also, to permit the use of the clamp 20 in competitive types of television reecivers, it must be relatively inexpensive to manufacture. It has been found that a number of plastic materials, such as, for example, cellulose acetate and cellulose acetate butyrate as well as high impact polystryrene meet all of the above requirements while being sufficiently flexible to insure tight gripping of the neck of the picture tube when a force is exerted on the clamp through the focalizer 16. It will thus be understood that while a few specific materials suitable for the clamp 20 have been given by way of example, other materials which are somewhat flexible, not substantially affected by the usual temperatures encountered in television receivers and which have a sufficiently high coefficient of friction to insure good gripping of the neck 10a by the clamp 20 may be used. Also, where it is desired to use materials having a low coefficient of friction or where it is desired to increase the gripping action of the clamp 20 no matter what material is used, a coating of a substance having a high coefficient of friction and which does not become tacky at elevated temperatures may be provided on the tips of the protuberances 37.

In furtherance of maintaining the cost of the clamp 20 as low as possible it is desirable that it be formed in a single operation with a simple two-piece mold. Since, however, the apertures in the ears 34 and 35 for reception of the screw 33a are necessarily transverse to the apertures in the ears 38 and 39 for receiving the bolts 21 and 22, the usual simple two-piece mold cannot be utilized. However, by forming the apertures in the ears 34 and 35 by means of a plurality of contiguous recesses, alternately opening on opposite faces of the clamp 20 and communicating with one another near the interior thereof, transverse apertures for the reception of the screw 33a are provided. Thus, as shown in Fig. 2, the ear 35 is provided with a generally rectangular recess 35a which extends inwardly from the front face of the clamp 20 a considerable distance beyond the principal central plane of the clamp 20 and opens on the end of the ear 35 which faces the ear 34. A similar recess 35b is provided on the rear side of the ear 35 and opens on the outer end of the ear 35. The recesses 35a and 35b are adjacent, and since each extends beyond the central plane of the clamp 30 they communicate with one another along a transverse plane to provide a transverse aperture for the accommodation of the screw 33a. As illustrated, the inner ends of the recesses are rounded to provide a god bearing surface for the body of the screw 33a and also to facilitate the removal of the clamp 30 from the mold in which it is formed.

The ear 34 which is substantially identical with the ear 35 is shown partly broken away. It may be seen that in order to simplify installation and removal of the clamp from a picture tube, a recess 34c having a wall partly conforming to the shape of the nut 33b is provided in the outer end of the ear 34. It will be noted that the recess 34c also opens on one face of the clamp 20 to enable the forming of this recess in the molding operation.

Although this aspect of the invention has been embodied in a pair of ears 34 and 35 each having only two recesses, where a bolt of greater length is employed or where considerable lateral stress is applied to the bolt during use, additional recesses may conveniently be employed.

While there has been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A clamp for attaching a relatively heavy object to a cathode ray tube, comprising, a slotted structure adapted to at least partially surround the neck of said tube, a plurality of protuberances on said structure, means for contracting said structure in a direction perpendicular to the slot therein to urge said protuberances firmly against said tube, and means for attaching said object to said structure at only two points on said slotted structure, the points lying in a line perpendicular to the axis of the slot, so that attempted movement of said object along the neck of said tube causes bending of said structure along a line parallel to the axis of the slot thereby causing said clamp more firmly to engage said tube.

2. A clamp for preventing axial movement of a sweep yoke along the neck of a cathode ray tube and for positioning a focalizer along the neck of the tube, said clamp comprising a relatively thin body of bendable material, said body having a central circular opening enabling the body to slidably fit over the neck of the cathode ray tube, the body being recessed at spaced points along the inner surface of said opening whereby a number of protuberances are formed which are adapted to engage the outer surface of the neck of the cathode ray tube, said body being slotted from its central opening to and through its outer periphery, an off standing ear on either side of said slot carried by the body on the outer periphery thereof, said ears enabling said body to be bent in a direction transverse to the slot so as to reduce the diameter of the central opening thereof, thereby enabling said protuberances to engage the neck of the cathode ray tube, said body containing two holes coaxial with the central opening, said holes lying in a line perpendicular to the longitudinal axis of the aforementioned slot.

3. The clamp as set forth in claim 2 in which the aforementioned ears each having a pair contiguously arranged, adjoining recesses, the inner portions of which communicate with one another thereby forming a hole in each ear the holes in said ears lying in a line perpendicular to the longitudinal axis of the neck of the cathode ray tube over which the clamp is slid the arrangements being such that said aforementioned clamp is adapted to be made in a two piece mold.

4. A clamp as claimed in claim 3 characterized by the fact that said clamp carries a lug at its outer periphery extending in a direction parallel to the longitudinal axis of the neck of the cathode ray tube over which the clamp is to be slid.

5. A clamp as claimed in claim 3 characterized by the fact that the clamp is made of a bendable plastic material.

References Cited in the file of this patent

UNITED STATES PATENTS

| | | |
|---|---|---|
| 2,212,953 | Popp et al. | Aug. 27, 1940 |
| 2,234,720 | De Tar | Mar. 11, 1941 |
| 2,304,343 | Diesbach | Dec. 8, 1942 |
| 2,552,357 | Wendt | May 8, 1951 |
| 2,717,324 | Hall | Sept. 6, 1955 |
| 2,733,434 | Leonard | Jan. 31, 1956 |

FOREIGN PATENTS

| | | |
|---|---|---|
| 673,820 | Great Britain | June 11, 1952 |